United States Patent [19]

Hanisko et al.

[11] Patent Number: 5,737,961
[45] Date of Patent: Apr. 14, 1998

[54] METHOD AND APPARATUS FOR DETECTING OPERATIONAL FAILURE OF A DIGITAL ACCELEROMETER

[75] Inventors: John Cyril P. Hanisko, Southfield; Carl A. Munch, Troy, both of Mich.

[73] Assignee: TRW Inc., Lyndhurst, Ohio

[21] Appl. No.: 622,705

[22] Filed: Mar. 26, 1996

[51] Int. Cl.⁶ .......................... G01P 21/00; G01P 15/00
[52] U.S. Cl. .................. 73/1.38; 73/1.39; 73/514.35
[58] Field of Search .................... 73/1 D, 510, 514.01, 73/514.16, 514.32, 514.35, 1.38, 1.39

[56] References Cited

U.S. PATENT DOCUMENTS

| | | | |
|---|---|---|---|
| 3,633,158 | 1/1972 | Heibel | 354/153 |
| 3,781,824 | 12/1973 | Caiati et al. | 346/33 R |
| 4,112,425 | 9/1978 | Zobrist et al. | 341/110 |
| 4,303,978 | 12/1981 | Shaw et al. | 364/453 |
| 4,641,041 | 2/1987 | Mattes et al. | 307/10 R |
| 4,736,629 | 4/1988 | Cole . | |
| 4,873,452 | 10/1989 | Morota et al. | 307/10.1 |
| 4,950,915 | 8/1990 | Spies et al. | 307/10.1 |
| 4,980,573 | 12/1990 | White et al. | 307/10.1 |
| 5,060,504 | 10/1991 | White et al. | 73/1 D |
| 5,101,115 | 3/1992 | Nitschke et al. | 307/10.1 |
| 5,103,667 | 4/1992 | Allen et al. | 73/1 D |
| 5,253,510 | 10/1993 | Allen et al. | 73/1 D |
| 5,337,260 | 8/1994 | Spangler | 73/1 D X |
| 5,433,101 | 7/1995 | Spangler et al. | 73/1 D |
| 5,454,266 | 10/1995 | Chevroulet et al. | 73/514.35 |
| 5,528,520 | 6/1996 | Kemp | 73/514.32 X |
| 5,541,437 | 7/1996 | Watanabe et al. | 73/514.16 X |

OTHER PUBLICATIONS

A portion of Analog Devices, "1992 Data Converter Reference Manual", vol. II, pp. 2–16, 2–23, 2–403 through 2–407 and 2–410 through 2–417.

A portion of Analog Devices, "WP 12/16–Bit, 312.5kHz, Sigma Delta ADC", Preliminary Technical Information AD7721, pp. 1 through 12. May 1995.

*Primary Examiner*—Thomas P. Noland
*Attorney, Agent, or Firm*—Tarolli, Sundheim, Covell, Tummino & Szabo

[57] ABSTRACT

An apparatus includes an accelerometer (24) for providing an analog acceleration signal indicative of crash acceleration. A sigma-delta A/D converter (26) is operatively connected to the accelerometer (24) for providing a pulse-width-modulated gate enable signal (GES) with a value indicative of the acceleration signal. The GES signal is ANDED with a clock signal to produce a pulse-density signal (CNT) indicative of the acceleration signal. A monitoring circuit determines (i) whether at least one pulse-density signal occurs when a gate enable signal is HIGH (FLAG 1), and (ii) whether the pulse-density signal occurs when the gate enable signal is LOW (FLAG 2). Other embodiments test to see if the gate enable signal is either full scale ON (FLAG 3) or full scale OFF (FLAG 4) by using a second crash sensor (64). Timing circuits (302, 316) are used to ensure that the pulse duration of at least one pulse-width modulated gate enable signal is greater than predetermined value within a predetermined time period.

41 Claims, 2 Drawing Sheets

5,737,961

METHOD AND APPARATUS FOR DETECTING OPERATIONAL FAILURE OF A DIGITAL ACCELEROMETER

BACKGROUND OF THE INVENTION

1. Technical Field

The present invention is directed to actuatable restraint systems and is particularly directed to a method and apparatus for diagnostic testing of a digital accelerometer assembly.

2. Description of the Prior Art

Electronic accelerometers are used in a variety of systems, including actuatable restraint systems of automotive vehicles. Accelerometers in actuatable restraint systems provide an analog signal indicative of crash acceleration. The accelerometer is connected to a controller, such as a microcomputer. The microcomputer performs a crash algorithm on the acceleration signal for the purpose of discriminating between deployment and non-deployment crash conditions. When a deployment crash event is determined to be occurring, the restraint is actuated, e.g., an air bag is deployed.

Diagnostic arrangements for actuatable restraint devices are known. These known diagnostic arrangements monitor (i) if the electrical components of the firing circuit are connected properly, and (ii) if electrical components in the firing circuit have values within predetermined limits. Other diagnostic arrangements specifically test the accelerometer by electronically deflecting a movable mass of the accelerometer and monitoring if the output signal of the accelerometer is within an expected value.

SUMMARY OF THE INVENTION

The present invention provides a new method and apparatus for testing a digital accelerometer assembly particularly a digital accelerometer that uses a sigma-delta converter.

In accordance with one embodiment of the present invention, an apparatus comprises an accelerometer for providing an analog acceleration signal indicative of sensed acceleration. A/D converter means is operatively connected to the accelerometer for providing a gate enable signal and for providing a plurality of pulse signals when the gate enable signal is in a first state. A pulse-density of the plurality of pulse signals is indicative of a value of the analog acceleration signal. The apparatus further comprises means for detecting when at least one of the plurality of pulse signals does not occur when the gate enable signal is in the first state and for providing a signal indicative thereof.

In accordance with another embodiment of the present invention an apparatus is provided comprising an accelerometer for providing an analog acceleration signal indicative of sensed acceleration. A/D converter means is operatively connected to the accelerometer for providing a gate enable signal and for providing a plurality of pulse signals when the gate enable signal is in a first state and not providing pulse signals when the gate enable signal is in a second state, a pulse-density of the plurality of pulse signals when the gate enable signal is in the first state being indicative of a value of the analog acceleration signal. The apparatus further comprises means for detecting when at least one of the plurality of pulse signals occurs when the gate enable signal is in the second state and for providing a signal indicative thereof.

In accordance with another embodiment of the present invention, an apparatus comprises first crash sensing means for providing a crash acceleration signal upon the occurrence of a vehicle crash condition and means responsive to the first crash sensing means for providing a first crash severity signal functionally related to the crash acceleration signal. Second crash sensing means provides a second crash severity signal. The apparatus further comprises means for providing an error signal when the first and the second crash severity signals are not in agreement.

In accordance with another embodiment of the present invention, an apparatus comprises an accelerometer for providing an analog acceleration signal indicative of sensed acceleration. A/D converter means is operatively connected to the accelerometer for providing a plurality of pulse width modulated gate enable signals. The apparatus further includes means for determining when the time duration of each of the plurality of pulse width modulated gate enable signals is greater than a predetermined time value. The apparatus further comprises means for providing an error signal when (i) the plurality of pulse width modulated gate enable signals occurs within a predetermined time period, and (ii) the time duration of at least one of the plurality of pulse width modulated gate enable signals is not greater than the predetermined time value.

In accordance with another embodiment of the present invention, a method is provided for testing the operativeness of an acceleration sensing device of the type having an accelerometer for providing an analog acceleration signal indicative of sensed acceleration. The method comprises the steps of providing a plurality of clock pulse signals, and providing an A/D converter operatively connected to the accelerometer for providing a gate enable signal having a pulse-width indicative of a value of the analog acceleration signal. The method further includes the steps of passing the plurality of clock pulse signals when the gate enable signal is in a first state so as to provide a pulse-density signal including a plurality of pulses with a pulse density value being indicative of a value of the analog acceleration signal and detecting when at least one pulse of the plurality of pulses of the pulse-density signal does not occur when the gate enable signal is in the first state and providing a signal indicative thereof.

In accordance with another embodiment of the present invention, a method is provided for testing the operativeness of an acceleration sensing device of the type having an accelerometer for providing an analog acceleration signal. The method comprises the steps of providing a plurality of clock pulse signals and providing an A/D converter operatively connected to the accelerometer for providing a gate enable signal having a pulse-width indicative of a value of the analog acceleration signal. The method further includes the steps of passing the clock pulse signals when the gate enable signal is in a first state so as to provide a pulse-density signal of the plurality of pulse signals being indicative of a value of the analog acceleration signal, and detecting when at least one of the plurality of pulse signals of the pulse-density signal occurs when the gate enable signal is not in the first state.

In accordance with yet another embodiment of the present invention, a method is provided comprising the steps of providing an analog acceleration signal indicative of acceleration and converting the acceleration signal into a gate enable signal and for providing a plurality of pulse signals when the gate enable signal is in a first state and not providing a pulse signal when the gate enable signal is in a second state, a pulse-density of the plurality of pulse signals being indicative of a value of the analog acceleration signal. The method further includes the step of detecting when at least one of the plurality of pulse signals occurs when the gate enable signal is in the second state.

In accordance with another embodiment of the present invention, a method is provided comprising the steps of providing a crash acceleration signal upon the occurrence of a vehicle crash condition and providing a first crash severity signal functionally related to the crash acceleration signal. The method further comprises the steps of providing a second crash severity signal when crash severity is greater than a predetermined value, and providing an error signal when the first and the second crash severity signals are not in agreement.

In accordance with another embodiment of the present invention, a method is provided comprising the steps of providing an analog acceleration signal indicative of acceleration and converting the acceleration signal into a plurality of pulse width modulated gate enable signals. The method further includes the step of determining when the time duration of each of the plurality of pulse width modulated gate enable signals is less than a predetermined time value. The method further comprises the step of providing an error signal when (i) the plurality of pulse width modulated gate enable signals occur within a predetermined time period, and (ii) the time duration of at least one of the plurality of pulse width modulated gate enable signals is not greater than the predetermined time value.

BRIEF DESCRIPTION OF THE DRAWINGS

Further features of the present invention will become apparent to those skilled in the art to which the present invention relates from reading the following description with reference to the accompanying drawing, in which.

DESCRIPTION OF PREFERRED EMBODIMENT

Figure 1:
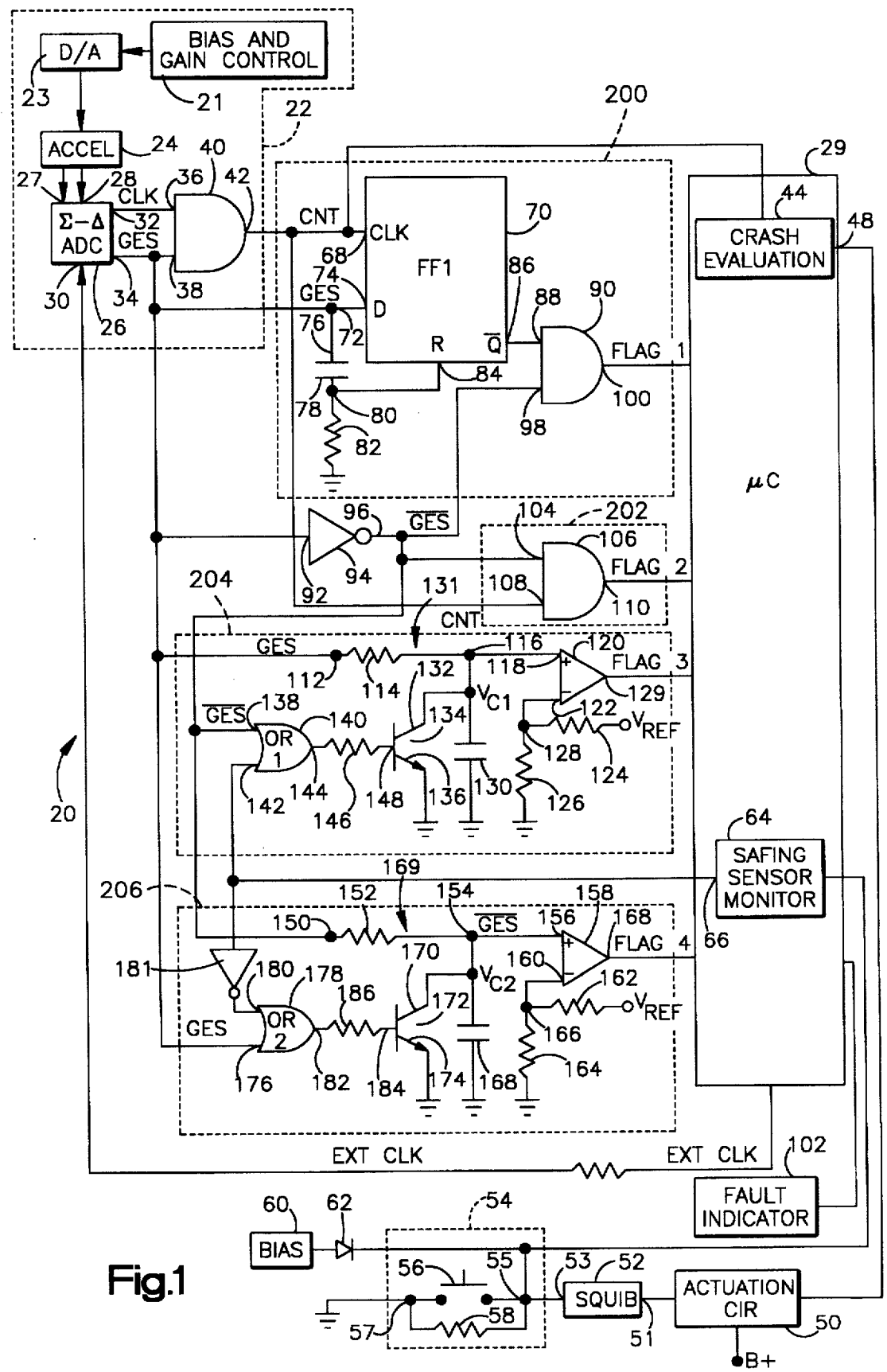
FIG. 1 is a schematic illustration of an apparatus for testing a digital pulse-density accelerometer in accordance with the present invention.

Referring to FIG. 1, a circuit 20, in accordance with the present invention, is used for testing a digital accelerometer assembly 22 in a vehicle actuatable restraint system. Although the invention is described with regard to an actuatable restraint system, those skilled in the art will appreciate that the invention is not limited to such application.

The digital accelerometer assembly 22 includes a micro-machined accelerometer 24. One type of accelerometer that may be used with the present invention is a differential capacitive accelerometer such as that described in U.S. Pat. No. 4,736,629 to Cole. Such an accelerometer includes two variable capacitors that can be connected in a capacitive bridge circuit. A bias and gain control circuit 21 applies the proper bias voltage to the capacitive bridge circuit through a digital-to-analog ("D/A") converter 23. The accelerometer outputs two differential signals to a sigma-delta ("Σ-Δ") analog-to-digital ("A/D") converter 26.

Preferably, micro-machined accelerometer 24 provides a differential analog signal indicative of vehicle crash acceleration to an inputs 27 and 28 of A/D converter 26. The A/D converter 26 converts the differential analog accelerometer signal from the micro-machined accelerometer 24 into a pulse-width modulated signal referred to as the gate enable signal ("GES").

Sigma-delta ("Σ-Δ") analog-to-digital converters are known in the art. One example of such a converter is manufactured by Analog Devices under part No. AD7721. Although this specific A/D converter can be used, any sigma-delta ("Σ-Δ") analog-to-digital converter that converts a differential analog input signal into a pulse-width modulated signal may be used.

A/D converter 26 includes an input 30 for receiving an external clock signal ("EXT CLK") from a controller 29. A/D converter 26 has a clock output 32 and the GES output 34 operatively connected to inputs 36, 38, respectively, of an AND gate 40. When micro-machined accelerometer 24 provides an analog signal indicative of vehicle crash acceleration to input 28, A/D converter 26 provides (i) a clock pulse stream signal ("CLK") to input 36 of AND gate 40 and, (ii) a pulse-width-modulated GES signal to input 38 of AND gate 40. Preferably, the CLK frequency is 500 kHz and the pulse-width-modulated GES signal frequency is 125 kHz. The GES signal pulse-widths are functionally related to sensed vehicle crash acceleration signal provided by accelerometer 24.

The AND'ed CLK and GES signals provide a pulse-density-modulated count signal ("CNT") on an output 42. One skilled in the art will appreciate that, since the duration of the pulses of the GES signal are functionally related to the sensed vehicle crash acceleration, the pulse-density-modulated CNT signal is, in turn, functionally related to the sensed vehicle crash acceleration. When GES is HIGH, the CLK pulses are output from the AND gate 40. When GES is LOW, no CLK pulses are passed, i.e., the output of AND gate 40 is LOW. The output 42 is a count signal ("CNT") where the number of counts per unit time is indicative of the acceleration value.

If the accelerometer assembly 22 is used in an occupant frontal restraint system, the axis of sensitivity of the micro-machined accelerometer 24 is oriented parallel with the front-to-rear axis of the vehicle. A positive acceleration signal from the micro-machined accelerometer 24 indicates a vehicle crash as occurs when the front of the vehicle crashes into an object. Preferably, the A/D converter 26 is set up so that the CNT value varies from a desired pulse-density minimum value (i.e., minimum count value) to a desired pulse-density maximum value (i.e., maximum count value). In accordance with one embodiment of the present invention, the assembly 22 is adapted so as to provide (i) 15 KHz at an acceleration of −50 g's, (ii) 250 kHz at a 0 g acceleration, and (iii) 500 kHz at an acceleration of +50 g's. It will be appreciated that the assembly 22 may be adapted so as to provide different pulse-density values.

Output 42 of AND gate 40 is operatively connected to controller 29. Controller 29 is preferably a microcomputer. The controller 29 performs a crash algorithm on the received CNT signal, i.e., on the sensed crash acceleration signal, to determine if a deployment crash condition is occurring. This crash algorithm is schematically shown as a crash evaluation algorithm 44 in the controller 29. A deployment crash condition is one in which deployment of the air bag will hopefully enhance occupant safety.

Any known crash algorithm may be used to evaluate the CNT signal. Typically, a crash algorithm determines a crash value referred to as "a crash metric." A determined crash metric is typically compared against a threshold value. If the crash metric value exceeds the threshold value, a determination is made that a deployment crash event is occurring.

As mentioned, the output signal 42 from AND gate 40 is a pulse-density value indicative of the sensed crash acceleration. Crash metrics such as crash velocity, crash energy (crash acceleration squared), crash displacement, and/or crash jerk may be determined. From the crash metric values, a crash algorithm discriminates the crash event into either a deployment or non-deployment condition.

An output 48 from the controller 29, in response to the crash evaluation algorithm 44, is controllably connected to an air bag actuation circuit 50. Air bag actuation circuit 50 typically includes a switching transistor (not shown) that is electrically connected in series between a source of electrical energy, e.g., the vehicle battery B+, and a first terminal 51 of a squib 52. Squib 52 includes a second terminal 53 connected to a safing sensor 54. Safing sensor 54 is a normally open inertia switch 56 having a first terminal 55 connected to squib 52. Inertia switch 56 has a second terminal 57 connected to electrical ground. Safing sensor 54 further includes a resistor 58 connected in parallel with inertia switch 56.

When crash evaluation algorithm 44 determines that a deployment crash event is occurring, a digital HIGH signal is provided at output 48 of controller 29 to the base of the transistor in actuation circuit 50 to switch the transistor ON. When the transistor switch is ON and the inertia switch 56 is closed, the squib 52 is actuated, i.e., ignited. When squib 52 is ignited, it, in turn, ignites a gas generating composition and/or pierces a container of pressurized gas. If the restraint system is an air bag system, ignition of the squib results in inflation of the air bag. It is also contemplated that other restraints could be used such as seat belt pretensioner, knee bolsters, etc.

A bias voltage source 60 is connected to the anode of a diode 62. The cathode of diode 62 is connected to (i) the first terminal 55 of safing sensor 54, and (ii) a safing sensor monitoring function 64 in controller 29 through an internal A/D converter of the controller 29. Safing sensor monitoring function 64 monitors whether inertia switch 56 is open or closed by comparing the voltage value present at terminal 55 against a reference voltage value. When the voltage value at terminal 55 is substantially at the value of the bias voltage source 60, indicating switch 56 is open, the safing sensor monitor 64 provides a digital LOW signal on an output 66. Upon closure of normally open switch 56, the voltage value at terminal 55 is pulled to substantially electrical ground and the safing sensor monitor 64, upon this occurrence, provides a digital HIGH signal on output 66.

Circuit 20 performs a plurality of diagnostic tests to determine the operativeness of the accelerometer assembly 22.

Plus/Minus Rail or Open Test

This test addresses operational failures which occur directly at the CNT output 42. The operational failures include (i) CNT output 42 being short circuited to the +/− rail, (ii) and the output 42 being open circuited. The +/− rail refers to the positive supply voltage and electrical ground for the ASIC. A plus/minus rail or open test circuit 200 performs this test.

Output 42 is electrically connected to a clock input 68 of a D-type FLIP-FLOP 70. Output 34 (the pulse-width modulated GES signal) is electrically connected to a junction 72. Junction 72 connects the GES signal to (i) a "D" input 74 of D-type FLIP-FLOP 70 and, (ii) a first capacitor terminal 76 of a capacitor 78. A second capacitor terminal 80 is connected (i) to electrical ground through a resistor 82, and (ii) to a reset ("R") input 84 of D-type FLIP-FLOP 70. Preferably, reset input 84 is a master reset input which sets the state of an output 86 independent of the presence of clock pulses at clock input 68. Output 86 is electrically connected to a first input 88 of an AND gate 90.

Output 34, the pulse-width modulated GES signal, is electrically connected to an input 92 of an inverter 94. Output 96 of inverter 94 is electrically connected to a second input 98 of AND gate 90. An output 100 of AND gate 90 is electrically connected to controller 29. The output of AND gate 90 represents a first fault flag ("FLAG 1"). When the output 90 is HIGH, a fault condition exists.

Controller 29 is controllably connected to a fault indicator 102. Fault indicator 102 is preferably a light in the passenger compartment positioned so as to alert the driver of a fault condition. Also, a digital error code indicative of a specifically detected fault condition can be stored in a memory in controller 29 for retrieval during vehicle service. An external EEPROM or other non-volatile memory may be used for storage of error codes.

In normal operation of the Σ-Δ analog-to-digital converter 26, the output gate enabling signal GES is continuously pulse-width modulating with the pulse-width being functionally related to the value of the acceleration signal. The CLK signal at output 32 is present when the EXT CLK signal is present at input 30. As mentioned above, when the GES signal is HIGH, the CLK signal passes through the AND gate 40. When the GES signal is LOW, the CLK signal is blocked. Since the continuous CLK signal and the pulse-width-modulated GES signal are AND'ed to provide the CNT signal, a HIGH GES signal at output 34 without a pulsed CNT signal at output 42 indicates an operational failure of digital pulse-density accelerometer assembly 22. The absence of a pulsed signal at output 42 occurs even though 34 is HIGH when (i) there is a short circuit of output 42 to plus rail, (ii) there is a short between output 42 to minus rail, or (iii) output 42 is open circuited.

When there is a failure at output 42, e.g., any one of the three mentioned possibilities occurs, no CNT signal is provided to the CLK input 68 of D-type FLIP-FLOP 70. If GES is initially at a digital LOW, the output 86 is LOW. A LOW signal is provided to input terminal 88 of AND gate 90. Since GES is LOW, inverter 94 provides a digital HIGH signal from output 96 to input 98 of AND gate 90. Therefore, input 88 is LOW and input 98 is HIGH resulting in a LOW signal on output 100 to controller 29.

When the GES signal is HIGH (i) a HIGH signal is provided to the D-input 74 of D-type FLIP-FLOP 70, and (ii) a transient spike occurs on capacitor 78 causing a transient voltage value at terminal 80. The transient spike at terminal 80 provides a reset "pulse" to master reset input 84. Since reset 84 is independent of the CLK input 68, the reset pulse changes the logic state of output 86 from LOW to HIGH. The output 86 switches HIGH upon the occurrence of the reset pulse and provides a HIGH signal to input 88 of AND gate 90. Also, when GES switches to a digital HIGH, inverter 94 switches the signal to a digital LOW thereby applying a LOW to input 98 of AND gate 90. Since input 88 is HIGH and input 98 is LOW, a LOW would be output from AND gate 90 and input to controller 29. At the end of the GES pulse-width, output 96 would switch HIGH. If no CNT pulses would occur at input 68 before GES went LOW because of one of the above-listed possible operational failures, HIGH's would be present at both inputs 88, 98 resulting in the AND gate 90 outputting a HIGH signal on output 100 to controller 29. When a HIGH signal is received by controller 29, fault FLAG 1 is set in controller 29. When fault FLAG 1 is set, controller 29 provides a control signal to actuate fault indicator 102. Fault FLAG 1 is actuated when no CNT pulses are received on input 68 during a time when the GES signal is HIGH. Recall that the frequency of the CLK signal is 500 kHz and the GES signal is 125 kHz. Therefore, if the assembly 22 were functioning correctly, one would expect at least one CLK pulse when GES is HIGH.

During normal operation of the accelerometer assembly 22, at least one CNT pulse would occur during the time period that GES is HIGH. Upon receipt of a CNT signal at input 68, the output 86 is switched to a LOW. Therefore, input 88 of AND gate 90 would then have a LOW. When GES switches to a LOW and output 96 switches HIGH, the output 100 will remain LOW and no failure or fault flag would be set.

Output Stuck at Positive Full Scale Tests

Another fault condition occurs when the output 42 is stuck at full scale meaning that the full CLK signal at input 36 is being output from AND gate 40. An output stuck at positive full scale test circuit 202 performs this test. If the output 34 is held or stuck at a full scale condition, the sensor assembly 22 is effectively indicating a full frontal crash condition is occurring. The output 42 could be stuck at full scale when there is an internal failure of the AND gate 40. This fault condition can be determined by testing for the presence of a CNT pulse from output 42 when GES signal is LOW.

Output 96 of inverter 94 is electrically connected to an input 104 of an AND gate 106. CNT output 42 of AND gate 40 is connected to an input terminal 108 of AND gate 106. An output 110 of AND gate 106 is electrically connected to controller 29. The output 110 of AND gate 106 is used to control setting of a fault FLAG 2. When the output of AND gate 106 is HIGH, a fault condition exists.

When the CNT signal is HIGH and the output 96 is HIGH (i.e., GES is LOW), the output 110 provides a HIGH signal to controller 29. When a HIGH signal is received by controller 29 from output 110, an internal fault FLAG 2 is set. When fault FLAG 2 is set, controller 29 provides a control signal to actuate the fault indicator 102. In accordance with another embodiment, upon receipt of a fault FLAG 2, a fault code indicative of the actual fault condition can be stored in a non-volatile memory for later analysis by a service technician.

GES LOCKED HIGH

Another fault condition exists when the GES signal is locked in a continuous HIGH condition. A GES locked high test circuit 204 performs this test. This fault condition can be detected by a "reasonability test." If a true vehicle state were producing a continuous GES HIGH condition, the vehicle would be in a substantial frontal crash condition. It is "reasonable-to-expect" that such a substantial crash condition would not persist for an extended period of time. If GES remained HIGH beyond an expected time period, one could reasonably assume that the continuous GES HIGH was the result of a failure of the sensor 22, as opposed to an occurrence of a severe frontal, deployment crash condition. A simultaneous safing sensor closed condition removes the failure implication of a continuous GES HIGH condition.

The GES output 34 from the A/D converter 26 is electrically connected to a first terminal 112 of a resistor 114. A second terminal 116 of resistor 114 is electrically connected to a positive input 118 of a comparator 120. The negative input 122 of comparator 120 is connected to a junction 128 of a voltage dividing network including resistors 124, 126. One terminal of resistor 124 is connected to junction 128 and the other terminal of resistor 124 is connected to a regulated source of electric energy $V_{Ref}$. One terminal of resistor 126 is connected to junction 128 and the other terminal of resistor 126 is connected to electrical ground. An output 129 of comparator 120 is electrically connected to controller 29. Output 129 is fault FLAG 3.

The second terminal 116 of resistor 114 is also electrically connected to a terminal $V_{C1}$ of a capacitor 130. The other terminal of capacitor 130 is connected to electrical ground. Resistor 114 and capacitor 130 form a timing circuit 131.

Terminal $V_{C1}$ is also electrically connected to a collector 132 of a transistor 134. The emitter 136 of transistor 134 is connected to electrical ground. Output 96 of inverter 94 is electrically connected to an input 138 of a first OR gate 140. The output 66 of safing sensor monitor function 64 of controller 29 is connected to the other input 142 of OR gate 140. An output 144 of OR gate 140 is electrically connected to a base 148 of transistor 134 through a resistor 146.

When GES is LOW, a HIGH is applied to the input 138. When the safing sensor 54 is open, a LOW is output from the safing sensor monitor 64. Since a HIGH is applied at input 138, a HIGH is output from OR gate 140 which results in turning ON of the transistor 134. When the transistor 134 is turned ON, the voltage value at $V_{C1}$ is substantially at electrical ground. Since the voltage value at the input 122 will, under these conditions, be greater than the voltage value at 118, the output 129 of comparator 120 will be LOW thereby indicating no fault condition.

When a GES signal goes HIGH, the voltage value at $V_{C1}$ increases. The value of the voltage at $V_{C1}$ is functionally related to (i) the ON time of the GES signal, and (ii) the time constant of the RC network 131. The longer GES is HIGH, the greater the voltage at $V_{C1}$. When the GES signal is locked in an enable state, thereby producing a 100% duty cycle signal, the voltage value at terminal $V_{C1}$ rises toward the HIGH value of the GES signal.

Inverter 96 provides a LOW to input 138 of OR gate 140 when there is a HIGH GES signal at output 34. As described above, safing sensor monitor function 64 provides a LOW signal when normally open inertia switch 56 is open. When both inputs to OR gate 140 are LOW, output 144 provides a LOW signal to the base 148 of transistor 134 keeping the transistor switch OFF. When either input 138 or 142 of OR gate 140 are HIGH, the output 144 actuates transistor 134 to an ON condition thereby closing the transistor switch. When transistor switch 134 closes, terminal $V_{C1}$ is pulled to ground and the voltage value at the positive input 118 of comparator 120 remains lower than the reference voltage at the negative input 122. Therefore, output 129 of comparator 120 provides a LOW signal to controller 29. A LOW from output 129 indicates that the system is properly operating, i.e., there is no fault condition.

The voltage value at terminal $V_{C1}$ continues to increase until either input 138 of OR gate 140 receives a HIGH signal from inverter 94, or input 142 of OR gate 140 receives a HIGH signal from safing sensor monitor 64, i.e. indicating closing of switch 56 confirming a vehicle crash condition exists. If a HIGH signal is not received by one of the inputs 138, 142 within a predetermined time period defined by the RC time constant, comparator 120 provides a HIGH signal to controller 29. When a HIGH signal is received by controller 29, a fault FLAG 3 is set in controller 29. When fault FLAG 3 is set, controller 29 provides a control signal actuating fault indicator 102. This arrangement permits use of time-duration reasonability criteria to infer the implications, for sensor integrity, of forward-directed maximum-acceleration data from the sensor.

Output Stuck at Minus Full Scale Tests

It is possible that the GES output 34 is stuck or held at minus full scale, i.e., the CNT value remains at the minimum value. This condition is detected by monitoring that GES is less than its smallest allowable pulse width even after the safing sensor is sensed as being closed. Again, this condition is detected using a "reasonability test." It is not reasonable for the safing sensor to remain closed for a predetermined time period and for the GES signal to have a pulse width less than a smallest allowable value. An output stuck at minus full scale test circuit 206 performs this test.

Output 96 from inverter 94 is electrically connected to a first terminal 150 of a resistor 152. A second terminal 154 of resistor 152 is electrically connected to a positive input 156 of a comparator 158. The negative input 160 of comparator 158 is connected to a voltage dividing network including resistors 162, 164 at a junction 166. One terminal of resistor 162 is connected to junction 166 and the other terminal is connected to a regulated source of electric energy $V_{REF}$. One terminal of resistor 164 is connected to junction 166 and the other terminal is connected to electrical ground. An output 168 of comparator 158 is electrically connected to controller 29. The output 168 is fault FLAG 4.

The second terminal 154 of resistor 152 is electrically connected to a terminal $V_{C2}$ of a capacitor 168. The other terminal of capacitor 168 is connected to electrical ground. Resistor 152 and capacitor 168 form a timing circuit 169.

Terminal $V_{C2}$ is electrically connected to the collector 170 of a transistor 172. The emitter 174 of transistor 172 is connected to electrical ground. Output 34 of A/D converter 26 is electrically connected to an input 176 of an OR gate 178. Output 68 of the safing sensor monitor function 64 is coupled to an input 180 of OR gate 178 through an inverter 181. An output 182 of OR gate 178 is electrically connected to a base 184 of transistor 172 through a resistor 186.

When GES is LOW (the output 96 is HIGH), the voltage value at $V_{C2}$ increases. The value of the voltage at $V_{C2}$ is functionally related to (i) the time the GES signal is LOW, and (ii) the time constant of the RC network 131. The longer GES is LOW, the greater the voltage at $V_{C2}$. When the GES signal is held at ground, thereby producing a 0% duty cycle signal, the voltage value at terminal $V_{C2}$ rises toward the HIGH value, e.g., 5 volts.

When GES is LOW, a LOW is applied to the input 176 of the OR gate 178. When the safing sensor 54 is open, a LOW is applied to the input of inverter 181 which, in turn, applies a HIGH to the input 180 of OR gate 178. This keeps transistor 172 ON so that the voltage value at $V_{C2}$ is lower than the voltage at input 160. If the safing sensor closes, the transistor 172 is turned OFF and the voltage at $V_{C2}$ begins to rise. If GES does not switch to a HIGH within a predetermined time period from when the safing sensor closed, the voltage value at $V_{C2}$ will exceed the voltage value at input 160 and fault Flag 4 will go HIGH. When fault FLAG 4 goes HIGH, controller 29 provides a control signal actuating fault indicator 102.

Figure 2:
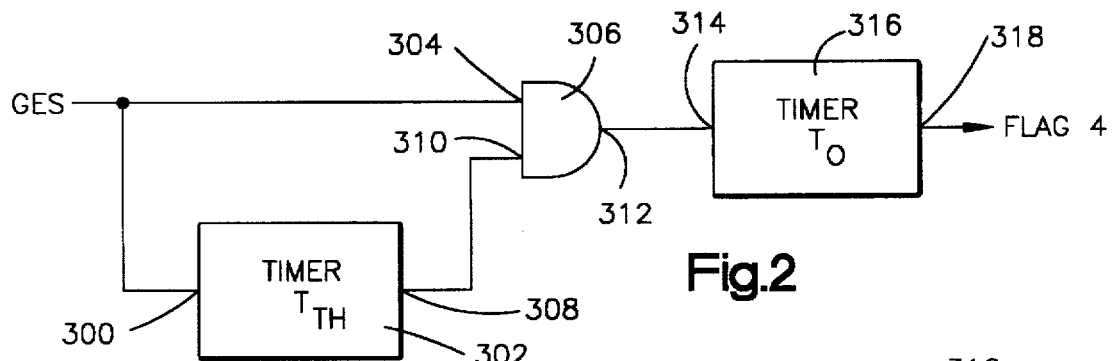
FIG. 2 is a schematic block diagram illustrating an alternative embodiment of a portion of the apparatus shown in FIG. 1.
Figure 3:
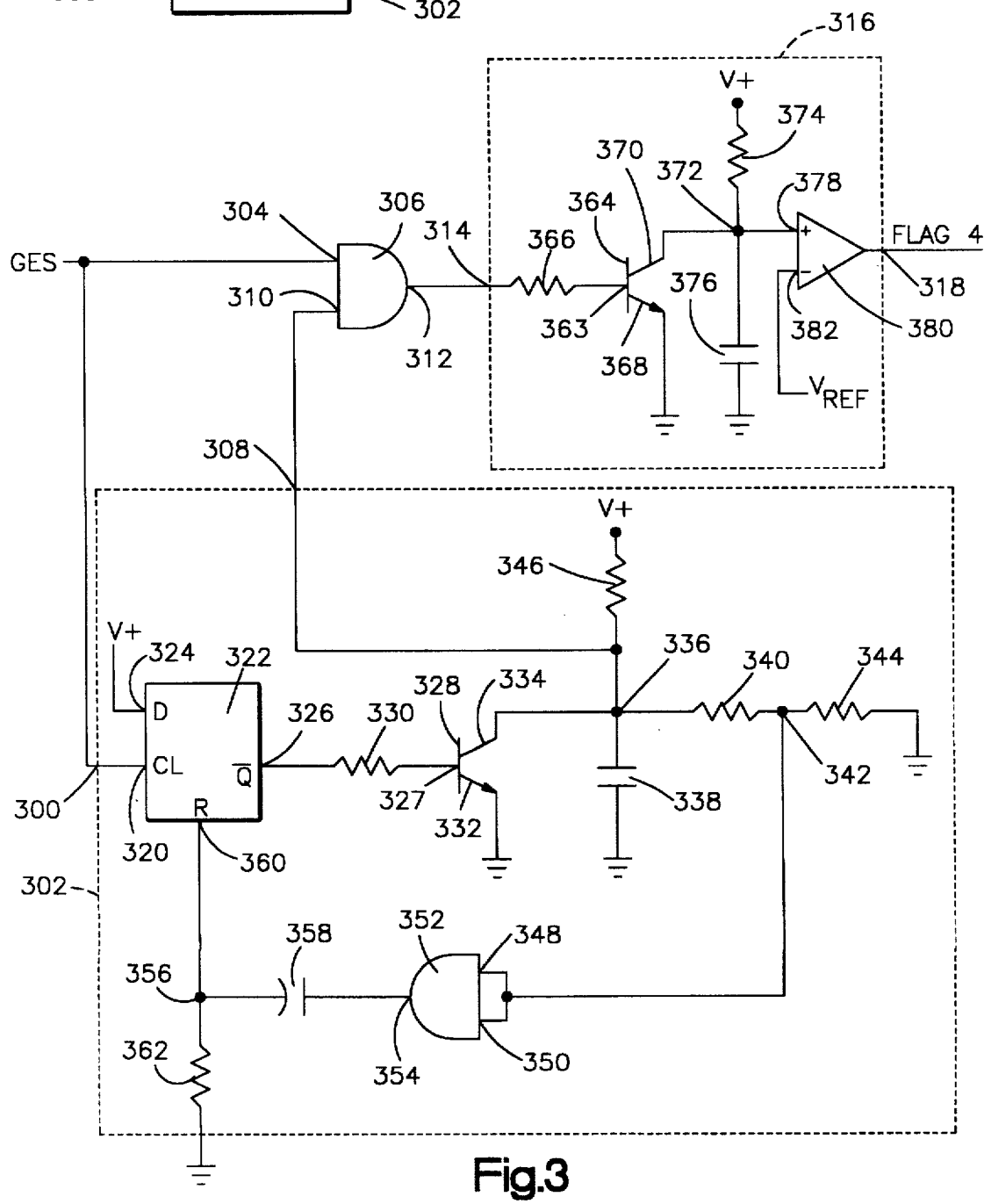
FIG. 3 is a schematic circuit diagram illustrating an implementation of the block diagram in FIG. 2.

Referring to FIGS. 2 and 3, another embodiment of an apparatus for monitoring the output stuck at minus full scale is shown.

GES output 34 is electrically connected to (i) an input 300 of a timer circuit 302, and (ii) a first input 304 of an AND gate 306. An output 308 of timer 302 is connected to a second input 310 of AND gate 306. An output 312 of AND gate 306 is electrically connected to an input 314 of a timer 316. An output 318 of timer 316 is electrically connected to controller 29. The output 318 is the fault FLAG 4.

Referring to FIG. 3, the construction and operation of timers 302 and 316 will be better appreciated. Input 300 is connected to a clock input 320 of a D-type FLIP-FLOP 322. A regulated supply source V+ is electrically connected to a D-input 324 of FLIP-FLOP 322. An output 326 is connected to a base 327 of a transistor 328 through a resistor 330. An emitter 332 of transistor 328 is connected to electrical ground. A collector 334 of transistor 328 is connected to a junction 336. One terminal of a capacitor 338 is connected to junction 336. The other terminal of capacitor 338 is connected to electrical ground. One terminal of a resistor 340 is electrically connected to junction 336 and the other terminal of resistor 340 is connected to a junction 342. Junction 342 is electrically connected to a first input 348 and a second input 350 of an AND gate 352. An output 354 of AND gate 352 is connected to a junction 356 through a capacitor 358. Junction 356 is connected to a reset input 360 of FLIP-FLOP 322. A resistor 362 is electrically connected between junction 356 and electrical ground. A resistor 344 is connected between junction 342 and electrical ground. A regulated supply source V+ is electrically connected to junction 336 through a resistor 346. Junction 336 is connected to timer output 308.

As described above, output 308 of timer 302 is connected to input 310 of AND gate 306. Output 312 of AND gate 306 is electrically connected to input 314 of timer 316. Input 314 is electrically connected to a base 363 of a transistor 364 through a resistor 366. An emitter 368 of transistor 364 is connected to electrical ground. A collector 370 of transistor 364 is connected to a junction 372. A regulated supply source V+ is connected to junction 372 through a resistor 374. A capacitor 376 is connected between junction 372 and electrical ground. Junction 372 is electrically connected to a positive input 378 of a comparator 380. A negative input 382 of comparator 380 is connected to a reference supply $V_{REF}$. Comparator 380 provides an output signal on output 318 to controller 29 which is the fault FLAG 4.

The switching voltage $V_{ST}$ of AND gates 306, 352 is the threshold value that the gates use to distinguish between a digital LOW and a digital HIGH at their inputs. The switching voltage value $V_{ST}$ is less than the regulated voltage source value V+. The resistance value of resistor 346 is less than the sum of the resistance values of resistors 340 and 344 so that when transistor 328 is OFF for a predetermined time period, capacitor 338 can charge to a value greater than $V_{ST}$.

The circuit in FIGS. 2 and 3 monitor whether any of a plurality of GES pulse width durations ($T_{GES}$), occurring within a predetermined time period ($T_o$), has a time duration greater than a predetermined time value ($T_{TH}$). If any pulse duration $T_{GES}$>$T_{TH}$ within the time period $T_o$, then timer 316 is reset. The time duration $T_o$ is selected such that a plurality of GES pulses occur within the time period $T_o$. If none of the pulse durations $T_{GES}$ is greater than $T_{TH}$ during the time period $T_o$, an error signal is provided on fault FLAG 4 to controller 29. The predetermined threshold value $T_{TH}$ is selected such that $T_{TH}$<$f^{-1}$ where "f" is the pulse repetition rate of GES.

Timer 316 (timer for $T_o$) begins timing out when the system is initialized upon starting of the vehicle and GES signals are initially provided from output 34. When GES switches from LOW to HIGH, the timer 302 (timer for $T_{TH}$)

is started. The HIGH GES signal from output 34 is provided to (i) clock input 320 of FLIP-FLOP 322, and (ii) input 304 of AND gate 306. When FLIP-FLOP 322 is clocked, the signal on output 326 switches from HIGH to LOW. When the output 326 switches to LOW transistor 328 is disabled, thereby allowing capacitor 338 to begin charging. As capacitor 338 charges toward V+ through resistor 346, the voltage value at junction 336 increases. After a time delay $T_{TH}$, the voltage value at junction 336 exceeds the value of $V_{ST}$ and timer 302 outputs a HIGH signal on output 308 to input 310 of AND gate 306. The HIGH signal is provided by timer 302 for a time period $\Delta T$.

$T_{TH}$ may be expressed as $$T_{TH} = R_1 C_1 \ln \frac{V}{V - V_{ST}} \quad (1)$$

and $\Delta T$ may be expressed as $$\Delta T = R_1 C_1 \ln \frac{V}{V - \left(1 + \frac{R_{340}}{R_{344}}\right) V_{ST}} - T_{TH} \quad (2)$$

Capacitor 338 continues to charge after the time delay $T_{TH}$. Since capacitor 338 continues to charge, the HIGH signal from output 308 is still provided to input 310 until the voltage value at junction 336 reaches a value equal to $(1 + _{340}/R_{344})V_{ST}$. Once the voltage at junction 336 reaches this value, both inputs 348, 350 of AND gate 352 are HIGH and the output 354 switches from LOW to HIGH. When the output of AND gate 352 switches to HIGH, a positive pulse is transmitted through the differentiator formed by capacitor 358 and resistor 362 and resets FLIP-FLOP 322. When FLIP-FLOP 322 is reset by the pulse signal, timer 302 returns to its quiescent state by switching the output 326 from LOW to HIGH. When the output 326 is switched to HIGH, transistor 328 is turned ON and capacitor 338 is discharged. The timing sequence described above repeats with every LOW to HIGH transition of GES.

If the time duration of the HIGH $T_{GES}$ pulse width duration is greater than the time value $T_{TH}$, the output signal of AND gate 306 switches to HIGH and resets Timer 316 to zero by turning transistor 364 ON thereby discharging capacitor 376. If the time duration of $T_{GES}$ is less than the time value $T_{TH}$, the output signal 312 of AND gate 306 remains LOW and timer 316 continues to time out as a function of resistor 374 and capacitor 376. When the voltage value at junction 372 is greater than the voltage value $V_{REF}$ comparator 380 provides a fault FLAG signal on output 318. In other words, if there are no occurrences of $T_{GES} > T_{TH}$ during the time period $T_o$, timer 316 times out and outputs a fault FLAG to controller 29.

From the above description of the invention, those skilled in the art will perceive improvements, changes and modifications. Such improvements, changes and modifications within the skill of the art are intended to be covered by the appended claims.

Having described the invention, we claim the following:

1. An apparatus comprising:

an accelerometer for providing an analog acceleration signal indicative of sensed acceleration;

A/D converter means operatively connected to said accelerometer for providing a gate enable signal and for providing a plurality of pulse signals when the gate enable signal is in a first state, a pulse-density of the plurality of pulse signals being indicative of a value of the analog acceleration signal; and means for detecting when at least one of the plurality of pulse signals does not occur when the gate enable signal is in the first state and for providing a signal indicative thereof;

wherein the gate enable signal is a pulse-width modulated signal in which the pulse-width is functionally related to the value of the analog acceleration signal and wherein said A/D converter means further includes means for ANDING said pulse-width modulated signal with a continuous clock signal.

2. An apparatus comprising:

an accelerometer for providing an analog acceleration signal having a value indicative of sensed acceleration;

A/D converter means operatively connected to said accelerometer for outputting a gate enable signal having a first state with a signal value functionally related to the value of the acceleration signal, and for outputting a plurality of pulse signals with a pulse-density indicative of the value of the acceleration signal when said gate enable signal is in the first state; and means for detecting when at least one of the plurality of pulse signals does not occur when the gate enable signal is in the first state and for providing a signal indicative thereof.

3. An apparatus as set forth in claim 2, wherein the gate enable signal has a second state, and further including means for detecting when at least one of the plurality of pulse signals occurs when the gate enable signal is in the second state and for providing a signal indicative thereof.

4. An apparatus as set forth in claim 2 including means for measuring a time duration of the first state of the gate enable signal, and means for detecting when the first state of the gate enable signal exceeds a predetermined time period and for providing a signal indicative thereof.

5. An apparatus as set forth in claim 4, wherein said means for detecting when the first state of the gate enable signal exceeds the predetermined time period includes means for sensing a condition, associated with the occurrence of the acceleration sensed by said accelerometer, and for providing a signal to end the measurement of the duration of the first state of the gate enable signal.

6. An apparatus as set forth in claim 2, wherein the gate enable signal has a second state, and further including means for initiating a time measurement, means for ending the time measurement when the gate enable signal goes from the second state to the first state, and means for detecting when the duration of the measured time period exceeds a predetermined value and for providing a signal indicative thereof.

7. An apparatus as set forth in claim 6, wherein said means for initiating a time measurement includes means for sensing a condition, associated with the occurrence of the acceleration sensed by said accelerometer, and for initiating the time measurement responsive to the signal indicative of the sensed associated condition.

8. An apparatus as set forth in claim 2 including means for sensing a condition associated with the occurrence of the acceleration sensed by said accelerometer and for providing a signal indicative thereof, means operatively connected to said means for sensing the associated condition for initiating a time measurement when said means for sensing the associated condition senses the associated condition, means for ending the time measurement when the gate enable signal begins the first state, and means for detecting when the duration of the measured time period exceeds a predetermined value and for providing a signal indicative thereof.

9. An apparatus as set forth in claim 2, wherein the sensed acceleration is indicative of a vehicle crash, and further including means for sensing another condition indicative of the vehicle crash and providing a signal indicative thereof.

10. An apparatus as set forth in claim 9 including means for determining whether said accelerometer and said means for sensing the other vehicle crash indicative condition are not in agreement regarding the crash indication of their respective signals and for providing a signal indicative of the agreement determination.

11. An apparatus as set forth in claim 10, wherein said means for determining includes means for measuring a time duration of the first state of the gate enable signal, and means for detecting when the first state of the gate enable signal exceeds a predetermined time period.

12. An apparatus as set forth in claim 11, wherein said means for determining includes means for ending measurement of the time duration in response to the crash indicative signal from said means for sensing the other vehicle crash indicative condition.

13. An apparatus as set forth in claim 10, wherein the gate enable signal has a second state, and said means for determining includes means for initiating a time measurement, means for ending the time measurement when the gate enable signal goes from the second state to the first state, and means for detecting when the duration of the measured time period exceeds a predetermined value.

14. An apparatus as set forth in claim 9, wherein said means for sensing the other vehicle crash indicative condition includes an inertia switch.

15. An apparatus as set forth in claim 2, wherein said A/D converter means includes means for ANDING the pulse-width modulated signal and a continuous clock signal to provide a pulse-density signal.

16. An apparatus comprising:
    an accelerometer for providing an analog acceleration signal having a value indicative of sensed acceleration;
    A/D converter means operatively connected to said accelerometer for outputting a gate enable signal having a first state with a signal value functionally related to the value of the acceleration signal and a second state, and for outputting a plurality of pulse signals with a pulse-density indicative of the value of the acceleration signal when said gate enable signal is in the first state; and
    means for detecting when at least one of the plurality of pulse signals occurs when the gate enable signal is in the second state and for providing a signal indicative thereof.

17. An apparatus as set forth in claim 16 including means for detecting when at least one of the plurality of pulse signals does not occur when the gate enable signal is in the first state and for providing a signal indicative thereof.

18. An apparatus as set forth in claim 16 including means for measuring a time duration of the first state of the gate enable signal, and means for detecting when the first state of the gate enable signal exceeds a predetermined time period and for providing a signal indicative thereof.

19. An apparatus as set forth in claim 18, wherein said means for detecting when the first state of the gate enable signal exceeds the predetermined time period includes means for sensing a condition, associated with the occurrence of the acceleration sensed by said accelerometer, and for providing a signal to end the measurement of the duration of the first state of the gate enable signal.

20. An apparatus as set forth in claim 16 including means for initiating a time measurement, means for ending the time measurement when the gate enable signal goes from the second state to the first state, and means for detecting when the duration of the measured time period exceeds a predetermined value and for providing a signal indicative thereof.

21. An apparatus as set forth in claim 20, wherein said means for initiating a time measurement includes means for sensing a condition, associated with the occurrence of the acceleration sensed by said accelerometer, and for initiating the time measurement responsive to the signal indicative of the sensed associated condition.

22. An apparatus as set forth in claim 16 including means for sensing a condition, associated with the occurrence of the acceleration sensed by said accelerometer, and for providing a signal indicative thereof, means operatively connected to said means for sensing the associated condition for initiating a time measurement when said means for sensing the associated condition senses the associated condition, means for ending the time measurement when the gate enable signal begins the first state, and means for detecting when the duration of the measured time period exceeds a predetermined value and for providing a signal indicative thereof.

23. An apparatus as set forth in claim 16, wherein the sensed acceleration is indicative of a vehicle crash, and further including means for sensing another condition indicative of the vehicle crash and providing a signal indicative thereof.

24. An apparatus as set forth in claim 23 including means for determining whether said accelerometer and said means for sensing the other vehicle crash indicative condition are not in agreement regarding the crash indication of their respective signals and for providing a signal indicative of the agreement determination.

25. An apparatus as set forth in claim 24, wherein said means for determining includes means for measuring a time duration of the first state of the gate enable signal, and means for detecting when the first state of the gate enable signal exceeds a predetermined time period.

26. An apparatus as set forth in claim 25, wherein said means for determining includes means for ending measurement of the time duration in response to the crash indicative signal from said means for sensing the other vehicle crash indicative condition.

27. An apparatus as set forth in claim 24, wherein said means for determining includes means for initiating a time measurement, means for ending the time measurement when the gate enable signal goes from the second state to the first state, and means for detecting when the duration of the measured time period exceeds a predetermined value.

28. An apparatus as set forth in claim 23, wherein said means for sensing the other vehicle crash indicative condition includes an inertia switch.

29. An apparatus as set forth in claim 16, wherein said A/D converter means includes means for ANDING the pulse-width modulated signal and a continuous clock signal to provide a pulse-density signal.

30. An method comprising:
    providing an analog acceleration signal from an accelerometer to A/D converter means, the acceleration signal having a value indicative of sensed acceleration;
    outputting a gate enable signal having a first state with a signal value functionally related to the value of the acceleration signal from the A/D converter means;
    outputting a plurality of pulse signals from the A/D converter means when the gate enable signal is in the first state, a pulse-density of the plurality of pulse signals being indicative of the value of the acceleration signal; and
    detecting when at least one of the plurality of pulse signals does not occur when the gate enable signal is in the first state.

31. A method as set forth in claim 30, wherein the gate enable signal has a second state, and further including detecting when at least one of the plurality of pulse signals occurs when the gate enable signal is in the second state.

32. A method as set forth in claim 30 including measuring a time duration of the first state of the gate enable signal, and detecting when the first state of the gate enable signal exceeds a predetermined time period.

33. A method as set forth in claim 30, wherein the gate enable signal has a second state, and further including initiating a time measurement, ending the time measurement when the gate enable signal goes from the second state to the first state, and detecting when the duration of the measured time period exceeds a predetermined value.

34. A method as set forth in claim 30 including sensing a condition associated with the occurrence of the acceleration sensed by the accelerometer and for providing a signal indicative thereof, initiating a time measurement in response to the signal, ending the time measurement when the gate enable signal begins the first state, and detecting when the duration of the measured time period exceeds a predetermined value.

35. A method as set forth in claim 30, including ANDING the pulse-width modulated signal and a continuous clock signal to provide a pulse-density signal.

36. An method comprising:
providing an analog acceleration signal from an accelerometer to A/D converter means, the acceleration signal having a value indicative of sensed acceleration;
outputting a gate enable signal having a first state with a signal value functionally related to the value of the acceleration signal from the A/D converter means, the gate enable signal having a second state;
outputting a plurality of pulse signals from the A/D converter means when said gate enable signal is in the first state, a pulse-density of the plurality of pulse signals being indicative of the value of the acceleration signal; and
detecting when at least one of the plurality of pulse signals occurs when the gate enable signal is in the second state and for providing a signal indicative thereof.

37. A method as set forth in claim 36 including detecting when at least one of the plurality of pulse signals does not occur when the gate enable signal is in the first state.

38. A method as set forth in claim 36 including measuring a time duration of the first state of the gate enable signal, and detecting when the first state of the gate enable signal exceeds a predetermined time period.

39. A method as set forth in claim 36, wherein the gate enable signal has a second state, and further including initiating a time measurement, ending the time measurement when the gate enable signal goes from the second state to the first state, and detecting when the duration of the measured time period exceeds a predetermined value.

40. A method as set forth in claim 36 including sensing a condition associated with the occurrence of the acceleration sensed by the accelerometer and for providing a signal indicative thereof, initiating a time measurement in response to the signal, ending the time measurement when the gate enable signal begins the first state, and detecting when the duration of the measured time period exceeds a predetermined value.

41. A method as set forth in claim 36, including ANDING the pulse-width modulated signal and a continuous clock signal to provide a pulse-density signal.

* * * * *